United States Patent Office 3,551,171

Patented Dec. 29, 1970

3,551,171

BaO—PbO—$SiO_2$ SEMICONDUCTOR ENCAPSULATION GLASS

George L. Thomas, Bay Village, Ohio, assignor to General Electric Company, a corporation of New York No Drawing. Filed Dec. 21, 1967, Ser. No. 692,294
Int. Cl. C03c 3/04
U.S. Cl. 106—53 10 Claims

ABSTRACT OF THE DISCLOSURE

Non-contaminating, low softening point, high expansion, semiconductor encapsulation glasses having a coefficient of expansion within the range of about 80 to about $100\times10^{-7}$ cm./cm./° C. The BaO—PbO—$SiO_2$ glasses contain no alkali and are sealable to dumet.

BACKGROUND OF THE INVENTION

(1) Field of the invention

The present invention relates to non-contaminating encapsulation glasses for semiconductor devices.

(2) Description of the prior art

Glass encapsulated semiconductor devices, such as diodes and the like, including a silicon crystal in the form of a wafer and electrical conductors connected to opposite sides of the wafer are now known in the art. To protect the device against harmful impurities, such as water vapor, from the atmosphere the encapsulating glass is hermetically sealed to the electrical conductors.

Dumet wire (copper clad nickel-iron alloy wire) has been used for many years as a leading-in conductor for electric lamps and electronic tubes and a number of soft glass compositions (low softening point, high expansion glasses) have been developed capable of hermetically sealing to such wire which has a coefficient of expansion of about $90\times10^{-7}$ radially and about $78\times10^{-7}$ cm./cm./° C. longitudinally. Attempts to use such well known commercial sealing glasses in the production of semiconductor devices including dumet leading-in conductors has resulted in defective devices because all such glasses contain substantial amounts of alkalies, such as sodium, potassium, lithium oxides, which have an adverse influence on the electrical characteristics of semiconductor devices.

SUMMARY OF THE INVENTION

The principal object of the invention is to provide alkali-free moderately low softening point, high expansion semiconductor encapsulation glasses capable of hermetically sealing to dumet and other electrical conductors having similar physical properties.

Accordingly, the glass compositions of the present invention have a softening temperature lower than 790° C., a coefficient of expansion of about $80\times10^{-7}$ to $100\times10^{-7}$ cm./cm./° C., contain no alkali oxides, have a viscosity range suitable for drawing into tubing, do not devitrify during tube drawing or reworking, have suitable electrical characteristics and viscosity-temperature relationships which permits the use of present sealing equipment and sealing temperatures harmless to semiconductor devices.

The glasses of the invention are described by the following calculated oxide compositional ranges in weight percent:

| | |
|---|---|
| $SiO_2$ | 20–45 |
| PbO | 0–60 |
| BaO | 20–60 |
| CaO | 0–10 |
| $B_2O_3$ | 0–12 |
| $Al_2O_3$ | 0–5 |
| ZnO | 0–5 |
| SrO | 0–12 |

The total of PbO and BaO should be less than 75% but greater than 49%. Glasses with the best working ranges, resistance to devitrification and expansion for sealing to dumet contain 30% to 50% BaO but with the BaO in this range other alkaline earth oxides, such as CaO, must be present to obtain a coefficient of expansion within the desired range.

The total content of PbO, BaO and CaO largely determines the coefficient of expansion of the glass but SrO also tends to increase the coefficient of expansion. The effectiveness of these four oxides in increasing the coefficient of expansion is in the following order: CaO, BaO, PbO, SrO, with CaO being the most effective.

The oxides $Al_2O_3$, $B_2O_3$ and ZnO are effective for increasing the resistance of the glass to devitrification.

$SiO_2$ is effective for increasing the working range and tends to increase the resistance to devitrification but in view of its tendency to lower the coefficient of expansion and raise the softening point, its amount should be limited to that which provides the desired effect on the properties of the glass.

By way of illustration of glass compositions of the invention, Table I shows three preferred glass compositions, given in terms of oxide composition in weight percent as calculated from the batch:

TABLE I

| | A | B | C |
|---|---|---|---|
| $SiO_2$ | 28.2 | 23.6 | 32.2 |
| PbO | 6.2 | 32.1 | 5.7 |
| BaO | 47.3 | 30.2 | 43.5 |
| CaO | 5.0 | 3.2 | 1.9 |
| $B_2O_3$ | 7.0 | 6.8 | 4.0 |
| $Al_2O_3$ | 4.0 | 2.6 | 4.8 |
| ZnO | 2.0 | 1.3 | 1.9 |
| SrO | | | 5.8 |
| $Sb_2O_3$ | 0.2 | 0.4 | 0.1 |
| $As_2O_3$ | 0.1 | 0.1 | 0.1 |
| Softening Point, ° C | 734 | 654 | 764 |
| Annealing Point, ° C | 620 | 535 | 635 |
| Thermal Expansion$\times10^{-7}$ cm./cm./° C. (0–300° C.) | 88.6 | 85.6 | 87.8 |
| Log R 350° C | 10.4 | 9.9 | 10.3 |
| Liquidus Temperature, ° C | 750 | 760 | 800 |

By way of further illustration, Table II shows three additional glass compositions given in the same terms as in Table I which may be used in carrying out the invention:

TABLE II

| | A | B | C |
|---|---|---|---|
| $SiO_2$ | 40.7 | 23.3 | 26.5 |
| PbO | 6.0 | 31.5 | 47.5 |
| BaO | 35.0 | 32.4 | 24.8 |
| CaO | 1.0 | 3.2 | ------ |
| $B_2O_3$ | 3.0 | 5.8 | 0.4 |
| $Al_2O_3$ | 2.0 | 2.4 | 0.7 |
| ZnO | 2.0 | 1.2 | ------ |
| SrO | 10.0 | ------ | ------ |
| $Sb_2O_3$ | 0.2 | 0.1 | ------ |
| $As_2O_3$ | 0.1 | 0.1 | 0.2 |
| Softening Point, ° C | 787 | 657 | 649 |
| Annealing Point, ° C | 660 | 542 | 490 |
| Thermal Expansion$\times10^{-7}$ cm./cm./° C. (0–300° C.) | 81.1 | 91.2 | 90.8 |
| Liquidus Temperature, ° C | 850 | 800 | 850 |

It will be noted that the glass compositions of Tables I and II contain minor amounts of the conventional refining agents $As_2O_3$ and $Sb_2O_3$. A higher content of $Sb_2O_3$ than disclosed above has an unfavorable effect on the electrical characteristics of encapsulated semiconductor devices.

The glasses of the present invention may be made from conventional batch ingredients and in accordance with conventional practice for soft alkali oxide-containing sealing glasses. By way of a specific example, the following batch composition, in approximate parts by weight of batch materials, was melted on a twelve hour melting schedule with a maximum temperature of about 1350° C. in a conventional fuse-cast refractory 800 pound capacity day tank to produce the glass of composition A, Table I, above.

| | |
|---|---|
| Sand | 91 |
| Wollastonite | 43 |
| Barium carbonate | 240 |
| Barium nitrate | 8 |
| Litharge (PbO) | 24¾ |
| Zinc oxide | 8 |
| Boric acid | 50 |
| Aluminum hydrate | 24½ |
| Antimony oxide | ¾ |
| Arsenic oxide | ½ |

The invention is not limited to the above examples which are given by way of illustration. Variations of the invention may be made by those skilled in the art without departure from the spirit and scope of the invention.

It is contemplated that the glass of the present invention, while eminently satisfactory for encapsulation of semiconductor devices, as described above, may be used in making glass-to-glass and glass-to-metal seals for use in semiconductor or other electrical devices in whichc glasses or metals having coefficients of thermal expansion compatible with that of the glass of the present invention are used.

What I claim as new and desire to secure by Letters Patent of the United States is:

1. An alkali-free glass having a softening point of about 650° C. to about 787° C., a liquidus temperature of less than 900° C. and a coefficient of expansion of approximately between $80\times10^{-7}$ and $100\times10^{-7}$ per ° C. between 0° and 300° C., said glass consisting essentially of the following calculated oxide composition in weight percent:

| | |
|---|---|
| $SiO_2$ | 20–45 |
| PbO | 5.7–60 |
| BaO | 20–60 |
| CaO | 0–10 |
| $B_2O_3$ | 0–12 |
| $Al_2O_3$ | 0–5 |
| ZnO | 0–5 |
| SrO | 0–12 |

wherein the total of PbO plus BaO is from 49–75% by weight.

2. A glass according to claim 1 wherein the calculated oxide composition in weight percent consists essentially of:

| | |
|---|---|
| $SiO_2$ | 23.3–40.7 |
| PbO | 5.7–47.5 |
| BaO | 24.8–47.3 |
| CaO | 0–5.0 |
| $B_2O_3$ | 0.4–7.0 |
| $Al_2O_3$ | 0.7–4.8 |
| ZnO | 0–4.8 |
| SrO | 0–10.0 |
| $Sb_2O_3$ | 0–0.4 |
| $As_2O_3$ | 0.1–0.2 |

3. A glass according to claim 1 wherein the calculated oxide composition in weight percent consists essentially of:

| | |
|---|---|
| $SiO_2$ | 23.6–32.2 |
| PbO | 5.7–32.1 |
| BaO | 30.2–47.3 |
| CaO | 1.9–5.0 |
| $B_2O_3$ | 4.0–7.0 |
| $Al_2O_3$ | 2.6–4.8 |
| ZnO | 1.3–2.0 |
| SrO | 0–5.8 |
| $Sb_2O_3$ | 0.1–0.4 |
| $As_2O_3$ | 0.1 |

4. A glass according to claim 1 wherein the calculated oxide composition in weight percent consists essentially of:

| | |
|---|---|
| $SiO_2$ | 28.2 |
| PbO | 6.2 |
| BaO | 47.3 |
| CaO | 5.0 |
| $B_2O_3$ | 7.0 |
| $Al_2O_3$ | 4.0 |
| ZnO | 2.0 |
| SrO | — |
| $Sb_2O_3$ | 0.2 |
| $As_2O_3$ | 0.1 |

5. A glass according to claim 1 wherein the calculated oxide composition in weight percent consists essentially of:

| | |
|---|---|
| $SiO_2$ | 23.6 |
| PbO | 32.1 |
| BaO | 30.2 |
| CaO | 3.2 |
| $B_2O_3$ | 6.8 |
| $Al_2O_3$ | 2.6 |
| ZnO | 1.3 |
| SrO | — |
| $Sb_2O_3$ | 0.4 |
| $As_2O_3$ | 0.1 |

6. A glass according to claim 1 wherein the calculated oxide composition in weight percent consists essentially of:

| | |
|---|---|
| $SiO_2$ | 32.2 |
| PbO | 5.7 |
| BaO | 43.5 |
| CaO | 1.9 |
| $B_2O_3$ | 4.0 |
| $Al_2O_3$ | 4.8 |
| ZnO | 1.9 |
| SrO | 5.8 |
| $Sb_2O_3$ | 0.1 |
| $As_2O_3$ | 0.1 |

7. A glass according to claim 1 wherein the calculated oxide composition in weight percent consists essentially of:

| | |
|---|---|
| $SiO_2$ | 23.3–40.7 |
| PbO | 6.0–47.5 |
| BaO | 24.8–35.0 |
| CaO | 0–3.2 |
| $B_2O_3$ | 0.4–5.8 |
| $Al_2O_3$ | 0.7–2.4 |
| ZnO | 0–2.0 |
| SrO | 0–10.0 |
| $Sb_2O_3$ | 0.1–0.2 |
| $As_2O_3$ | 0.1–0.2 |

8. A glass according to claim 1 wherein the calculated oxide composition in weight percent consists essentially of:

| | |
|---|---|
| $SiO_2$ | 40.7 |
| PbO | 6.0 |
| BaO | 35.0 |
| CaO | 1.0 |
| $B_2O_3$ | 3.0 |
| $Al_2O_3$ | 2.0 |
| ZnO | 2.0 |
| SrO | 10.0 |
| $Sb_2O_3$ | 0.2 |
| $As_2O_3$ | 0.1 |

9. A glass according to claim 1 wherein the calculated oxide composition in weight percent consists essentially of:

| | |
|---|---|
| $SiO_2$ | 23.3 |
| PbO | 31.5 |
| BaO | 32.4 |
| CaO | 3.2 |
| $B_2O_3$ | 5.8 |
| $Al_2O_3$ | 2.4 |
| ZnO | 1.2 |
| SrO | — |
| $Sb_2O_3$ | 0.1 |
| $As_2O_3$ | 0.1 |

10. A glass according to claim 1 wherein the calculated oxide composition in weight percent consists essentially of:

| | |
|---|---|
| $SiO_2$ | 26.5 |
| PbO | 47.5 |
| BaO | 24.8 |
| CaO | — |
| $B_2O_3$ | 0.4 |
| $Al_2O_3$ | 0.7 |
| ZnO | — |
| SrO | — |
| $Sb_2O_3$ | — |
| $As_2O_3$ | 0.2 |

References Cited

UNITED STATES PATENTS

| | | | |
|---|---|---|---|
| 2,916,388 | 12/1959 | Earl | 106—49 |
| 2,972,544 | 2/1961 | Hirayama | 106—53 |
| 3,089,787 | 5/1963 | Sattler et al. | 106—53X |
| 3,398,004 | 8/1968 | Pendleton et al. | 106—52X |

HELEN M. McCARTHY, Primary Examiner

WALTER R. SATTERFIELD, Assistant Examiner

U.S. Cl. X.R.

106—49, 52; 117—129